No. 742,953. Patented November 3, 1903.

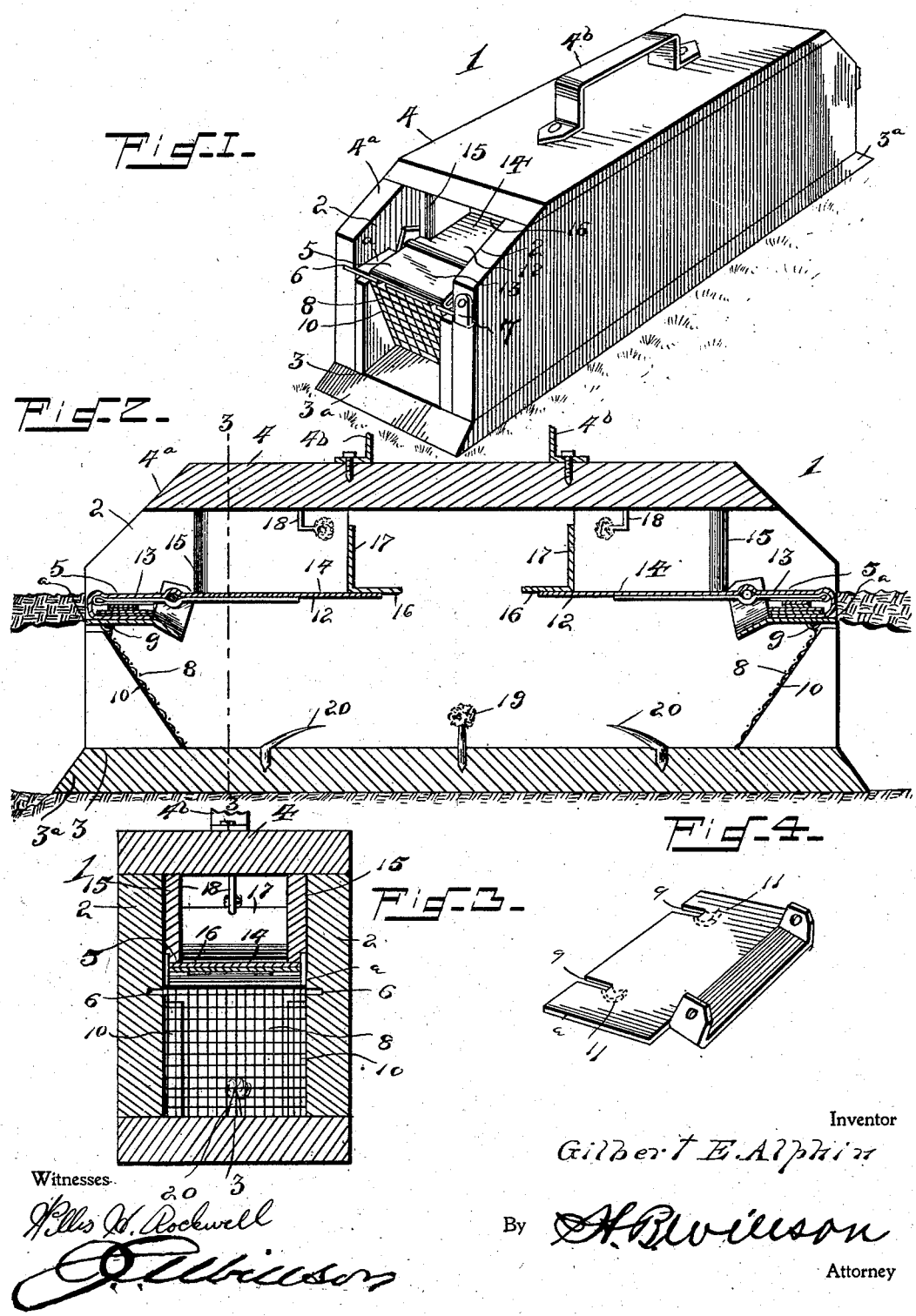

UNITED STATES PATENT OFFICE.

GILBERT E. ALPHIN, OF MOUNT OLIVE, NORTH CAROLINA.

ANIMAL-TRAP.

SPECIFICATION forming part of Letters Patent No. 742,953, dated November 3, 1903.

Application filed July 27, 1903. Serial No. 167,187. (No model.)

*To all whom it may concern:*

Be it known that I, GILBERT E. ALPHIN, a citizen of the United States, residing at Mount Olive, in the county of Wayne and State of North Carolina, have invented certain new and useful Improvements in Animal-Traps; and I do declare the following to be a full, clear, and exact description of the invention, such as will enable others skilled in the art to which it appertains to make and use the same.

My invention relates to certain new and useful improvements in traps for catching small animals, such as moles, rats, mice, &c.

The object of my invention is to produce a device of this character which is simple in construction, durable in use, and comparatively inexpensive of production.

With this and other objects in view the invention consists of certain novel features of construction, combination, and arrangement of parts, as will be hereinafter more fully described, and particularly pointed out in the appended claims, reference being had to the accompanying drawings, in which—

Figure 1 is a perspective view of my improved trap. Fig. 2 is a vertical longitudinal sectional view through the same, showing it set for catching either moles or mice, rats, &c. Fig. 3 is a vertical transverse sectional view through the same, taken on the line 3 3 of Fig. 2; and Fig. 4 is a detail perspective view of one of the horizontal end partitions upon which the pivoted gates and doors are mounted.

Referring to the drawings by numerals, 1 denotes the rectangular body of my trap, which comprises two side walls 2, a bottom 3, and a top 4. The ends of said body are open, and each is provided at its center with a horizontal partition 5, which is removably secured in the same by providing the inner faces of the side walls 2 with longitudinal grooves 6, in which the side edges of said partition slide. Catches 7, pivoted upon the ends of the sides 2, are adapted to lock said partition in position. The upper portions of the ends are preferably beveled or cut away, as shown at 4ª, so that an animal upon the top of the trap will be more likely to descend upon the exposed portions of the horizontal partitions. The ends of the bottom 3 may also be beveled, as shown at 3ª, to assist an animal, more especially a mole, in entering the trap. The body may be constructed of any desired material; but I prefer to use wood, and I provide upon the top 4 a suitable handle 4ᵇ, by means of which it may be easily moved about.

The partitions 5 provide at each end of the trap two entrances to the interior of the body, the lower entrances being closed by inwardly and upwardly swinging gates 8, which are hinged to the under side of the front edge of the partitions 5 by stamping out from the same the arms 9 and bending them to form eyes or loops in which the upper ends of the gates are hinged. These gates are preferably made of woven-wire fabric and have their outer side edges resting upon the inclined faces of side cleats 10.

Pivoted between the turned-up ears 11 of the partitions 5 are downwardly swinging or tilting trap-doors 12, which close the upper entrances to the interior of the body formed by said partitions. The outer portions 13 of the doors 12 are adapted to rest upon the upper sides of said partitions and are weighted to cause the inner portions 14 to assume a horizontal position and abut against the bottoms of the stops 15, secured upon the inside of the walls 2 and having their outer ends beveled, as shown. The extreme inner ends of the doors 12 contact with horizontal portions 16 of vertical partitions 17, which are preferably constructed of glass or other transparent material to admit light into the interior of the body.

Hooks or other devices 18 are secured to the inside of the top 4 at points above the inner ends of the doors 12, and upon which suitable bait may be secured to lure animals upon the portions 14 of the said doors. A suitable spur 19 is also provided upon the bottom 3 at the center of the same, and upon which a suitable bait may be secured when the lower entrances of the trap are used for catching rats and mice. Inwardly-inclined spurs 20 are provided upon the bottom 3 at points adjacent to the doors 8, which will prevent a mole from backing out from under the same, as will be readily understood.

In using the trap for catching moles or both moles and mice, rats, &c., the lower half of the body is buried in the earth, as shown in Fig. 2, so that the lower entrances register with a mole-track or the passage made by a mole as it moves under the surface of the earth. It will be seen that as a mole or other animal moves through the track in which the trap is buried the gates 8 will readily rise to permit it to pass under and will then drop to prevent its return. The horizontal partitions 5 being on a level with the surface of the earth will permit small animals, such as rats and mice, to pass into the upper entrances upon the trap-doors 12, which will drop them into the body of the trap, as will be readily understood. When the trap is used simply for catching rats, mice, and similar animals, the bottom 3 rests upon the floor or surface of the ground, and the animals may enter either the upper or lower entrance at either end. By swinging the catches 7 to one side the horizontal partitions, together with their attached doors and gates, may be easily removed to take animals from the trap or to clean the same.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. A trap comprising a body having an open end, a removable partition in said open end dividing the same into upper and lower entrances, an inwardly and upwardly swinging gate hingedly connected to the under side of said partition and closing the lower entrance, and a downwardly-tilting trap-door pivotally mounted upon the top of said partition and closing the upper entrance, substantially as described.

2. A trap comprising a body having open ends, removable partitions slidably mounted in said body and dividing said ends into upper and lower entrances, gravity-gates hingedly connected to said partitions and closing the lower entrances, and weighted trap-doors pivotally mounted upon said partitions and closing the upper entrances, substantially as described.

3. A trap comprising a rectangular body having open ends, removable partitions slidably mounted in grooves in said body and dividing said ends into upper and lower entrances, catches for locking said partitions in place, gravity-gates hingedly connected to the under side of said partitions and closing the lower entrances, side cleats for limiting the movement of said gates, weighted trap-doors pivotally mounted upon the upper sides of said partitions and closing the upper entrances, side stops for limiting the movement of said doors, vertical transverse partitions adjacent to the ends of said doors, and hooks or bait-holding devices in said body, substantially as described.

In testimony whereof I have hereunto set my hand in presence of two subscribing witnesses.

GILBERT E. ALPHIN.

Witnesses:
H. G. WILLIAMSON,
M. T. BREAZEALE.